DUAL ROTATION FOR ROCK DRILLS
Original Filed April 6, 1959 3 Sheets-Sheet 1
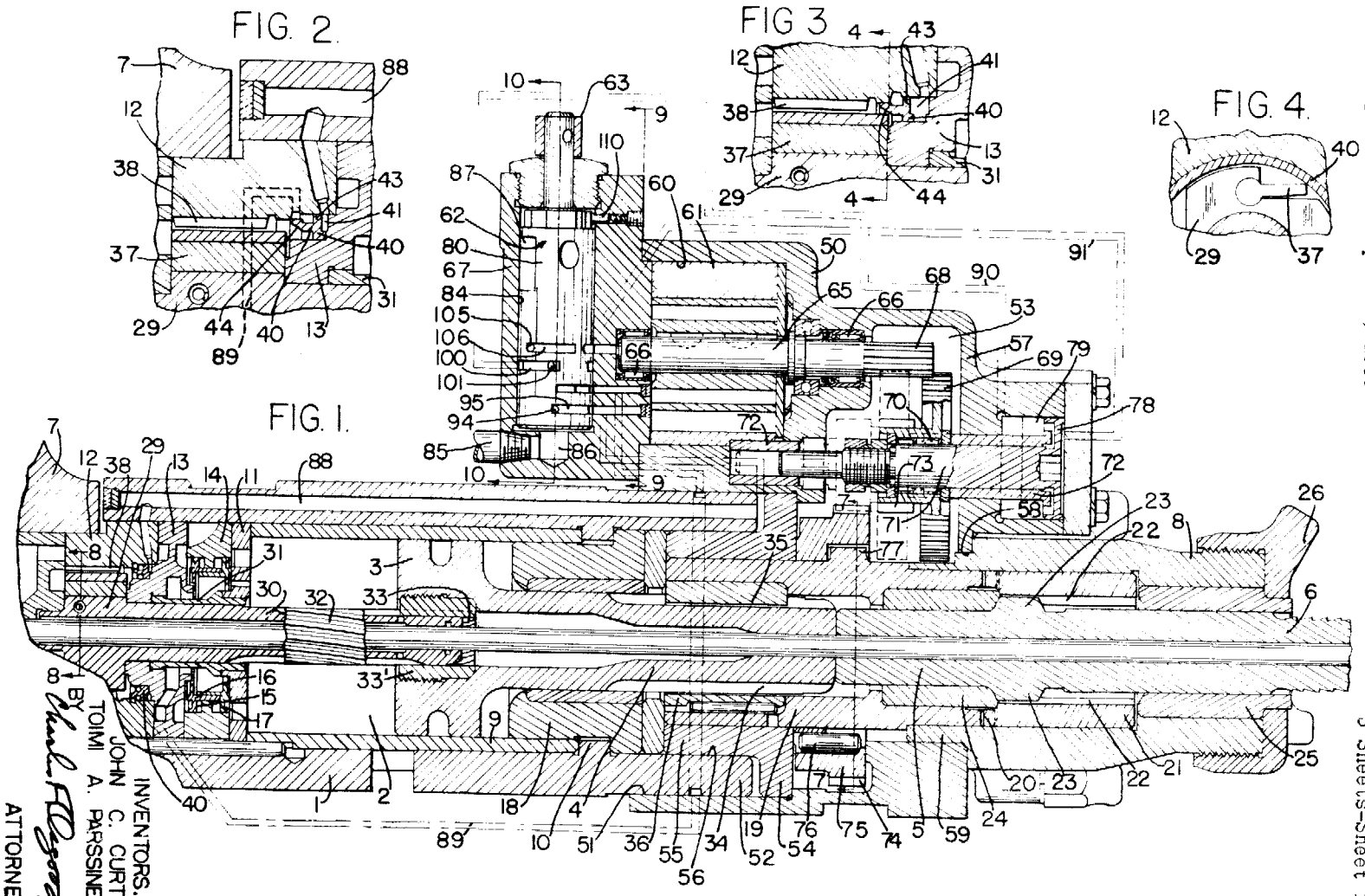
INVENTORS.
JOHN C. CURTIS
TOIMI A. PARSSINEN
BY Charles F. Lizzood,
ATTORNEY

DUAL ROTATION FOR ROCK DRILLS

Original Filed April 6, 1959 3 Sheets-Sheet 2

*INVENTORS.*
JOHN C. CURTIS
TOIMI A. PARSSINEN
BY Charles F. Ohgren,
ATTORNEY

DUAL ROTATION FOR ROCK DRILLS

Original Filed April 6, 1959 3 Sheets-Sheet 3

INVENTORS.
JOHN C. CURTIS
TOIMI A. PARSSINEN
BY Charles T. Ozgood
ATTORNEY

United States Patent Office

Re. 26,321
Reissued Dec. 5, 1967

26,321

DUAL ROTATION FOR ROCK DRILLS

John Clark Curtis and Toimi Antero Parssinen, Newport, N.H., assignors to Joy Manufacturing Company, Pittsburgh, Pa., a corporation of Pennsylvania Original No. 3,044,448, dated July 17, 1962, Ser. No. 804,366, Apr. 6, 1959. Application for reissue Mar. 24, 1964, Ser. No. 366,675
40 Claims. (Cl. 173—96)

Matter enclosed in heavy brackets [ ] appears in the original patent but forms no part of this reissue specification; matter printed in italics indicates the additions made by reissue.

This invention relates to rotation mechanism for a working implement for drilling holes in an earth formation and more particularly to a dual rotation mechanism for the drill steel of a hammer rock drill.

Heretofore it has become common practice to rotate intermittently the drill steel of hammer rock drills by means of a ratchet and pawl type rotation mechanism having a rifle bar spirally interlocked with the piston of the drill hammer motor so that upon each return stroke of the motor piston a partial rotation is imparted to the drill steel. Also it is well known to use an independent motor in lieu of the ratchet and pawl mechanism for rotating the drill steel of a hammer rock drill. The present invention contemplates improvements over such known type of rock drill rotation mechanism in that a dual rotation is provided wherein both the conventional ratchet and pawl type and indpendent motor rotation mechanisms are embodied which may operate independently or one in supplement to the other. In the present invention improved means is provided for coordinating the two separate rotation mechanisms having improved control means whereby the two mechanisms may operate separately or simultaneously as operating conditions may require.

An object of the present invention is to provide an improved rotation mechanism for the drill steel of a hammer rock drill. Another object is to provide a dual rotation mechanism for rock drills. A further object is to provide an improved rock drill dual rotation mechanism wherein improved control means is provided for coordinating the two rotation mechanisms whereby one may supplement or supplant the other. A still further object is to provide an improved dual rotation mechanism embodying both a ratchet and pawl rotation and an independent motor rotation together with improved control means therefor whereby the ratchet and pawl mechanism and the independent motor rotation may operate separately or concurrently. A still further object is to provide an improved dual rotation mechanism embodying both a ratchet and pawl rotation and independent motor rotation together with improved control means therefor whereby whenever the independent motor rotation is reversed the ratchet and pawl rotation is rendered inoperative. Yet another object is to provide an improved dual rotation having improved control means. Still another object is to provide improved driving connections between the independent rotation motor and the drill steel embodying a lost motion connection whereby the motor may accelerate before positive drive is effected. A further object is to provide improved driving connections between the rotation motor and the drill steel whereby an impact action is effected prior to the delivery of a constant rotative force to the drill steel. These and other objects and advantages of the invention will however more fully appear.

In the accompanying drawings there is shown for purposes of illustration one form which the invention may assume in practice.

In these drawings:

FIG. 1 is a central longitudinal vertical sectional view taken through a rock drill in which a rotation mechanism constructed in accordance with a preferred illustrative embodiment of the invention is incorporated.

FIG. 2 is an enlarged fragmentary section taken on the plane of FIG. 1, showing a portion of the means for releasing the pawls from the ratchet teeth.

FIG. 3 is a view similar to FIG. 2 showing the release means in pawl releasing position with ratchet and pawl rotation interrupted.

FIG. 4 is a detail section taken on line 4—4 of FIG. 3 showing the release ring.

Figure 10:
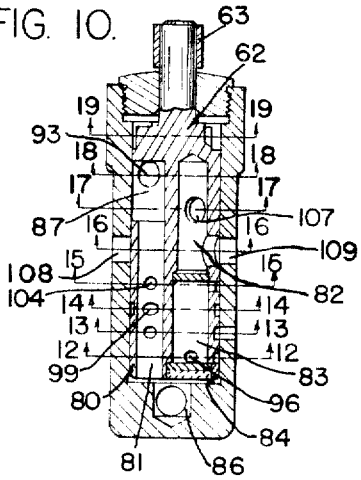
FIG. 10 is an axial section through the rotary control valve and its casing, taken on line 10—10 of FIG. 1, with the valve in a different position.
Figure 11:
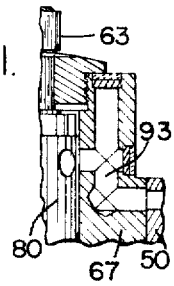
FIG. 11 is a detail section taken on line 11—11 of FIG. 9, showing a motor supply and exhaust passage.

FIGS. 12, 13, 14, 15, 16, 17, 18 and 19 are detail cross sections taken on lines 12—12, 13—13, 14—14, 15—15, 16—16, 17—17, 18—18, and 19—19 of FIG. 10, showing the various valve ports and passages.

Figure 20:
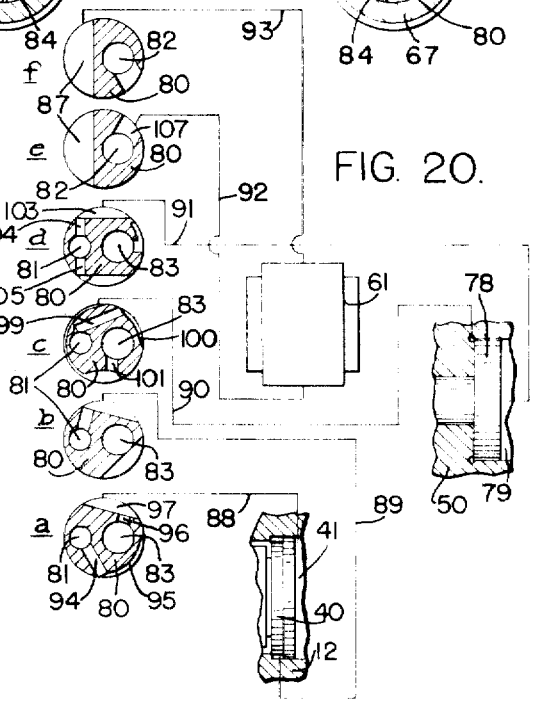

FIG. 20 is a diagrammatic view showing the control valve in dual rotation position.

Figure 21:
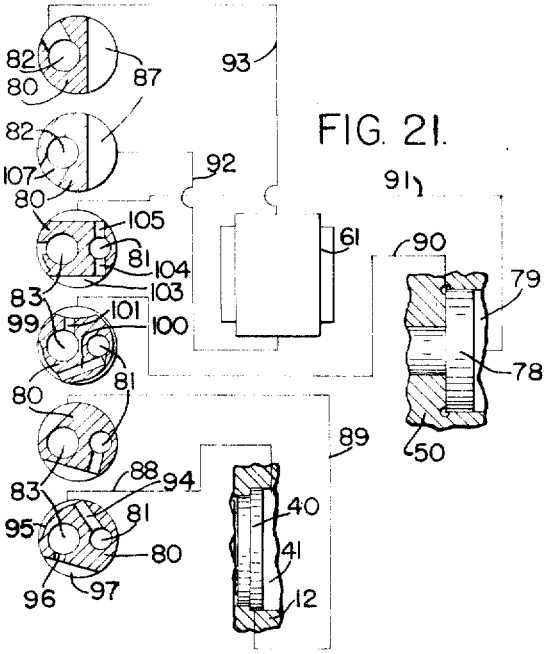

FIG. 21 is a view like FIG. 20, showing the control valve in independent rotation position, with the rotation motor reversed.

The rock drill in which the present invention is embodied may be of a conventional design, generally like that disclosed in the patent to John C. Curtis, No. 2,224,-861, dated Dec. 17, 1940, owned by the assignee of the present invention.

The rock drill, as shown in FIG. 1 of the drawings, comprises a motor cylinder 1 having a bore 2 containing a reciprocable hammer piston 3 having a forwardly extending striking bar 4 for delivering impact blows to the shank 5 of a sectional drill steel 6 adapted to carry a conventional drill bit, not shown. The motor cylinder has a rear head block 7 and a front chuck housing 8, and the block and housing are suitably attached to the opposite ends of the motor cylinder. The cylinder bore is formed in a linear sleeve 9 which is held axially forwardly against a shoulder provided by an internal annular flange 10 on the cylinder, and a rear plate 11 seats against the rear end of the sleeve as shown. Arranged between the head block 7 and the rear plate 11 is a ratchet ring 12 and cooperating rear and front valve box elements 13 and 14 which cooperate to provide a chamber 15 in which cooperating relatively movable dual distributing valves 16 and 17 are arranged similar to the valves disclosed in the above mentioned Curtis patent. The motor cylinder has a front head or buffer ring 18 formed with a front flange engaging the internal cylinder flange 10 and having its rearward portion fitting within the cylinder sleeve 9 as shown. The piston striking bar 4 extends through and is guided within the bore of the buffer ring, as shown. Journaled within the forward portion of the rock drill is a rotatable chuck sleeve 19 which is connected by clutch teeth 20 to a rotatable driver 21 having internal lugs 22 which engage usual lugs 23 on the drill steel shank whereby the drill steel may rotate with the chuck sleeve as it is percussively actuated. The steel shank is guided in a usual bushing 24 fitted within the chuck sleeve. The drill steel is reciprocably and rotatably guided within a front bushing 25 fitted within the front chuck housing and retained therein by a detachable front cap 26 threaded on the chuck housing.

Figure 8:
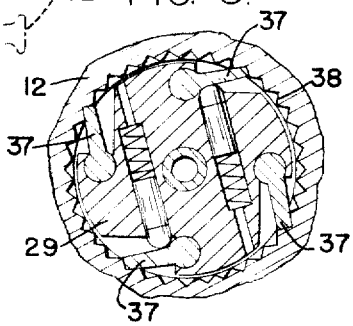
FIG. 8 is a cross section through the ratchet and pawl mechanism, taken on line 8—8 of FIG. 1.

Now referring to the ratchet and pawl type rotation mechanism it will be noted that a rotatable pawl carrier 29 has an integral rifle bar 30 which extends axially forwardly through a sleeve 31 providing the internal wall of the valve chamber 15 and through the rear plate 11, and this rifle bar has spiral grooves 32 slidingly interlocked with spiral vanes 33 of a rifle nut 33′ threadedly secured within the piston head. Formed exteriorly on the piston striking bar 4 are straight grooves 34 slidingly interlocked with straight vanes 35 of a chuck nut 36 secured within the rearward portion of the rotatable chuck sleeve 19. The pawl carrier 29 carries spring pressed pawls 37 which engage the ratchet teeth 38 of the ratchet ring 12, as shown in FIG. 8.

The hammer motor is of the well known pressure fluid actuated type and embodies usual ports and passages alternately controlled by the distributing valves 16, 17 which are also fluid actuated, for supplying fluid under pressure to the opposite ends of the cylinder bore at opposite sides of the piston head for effecting reciprocation of the hammer piston thereby to effect delivery of repeated impact blows to the shank of the drill steel in a well known manner. As the hammer piston 3 moves forwardly to effect its working stroke, i.e. to deliver an impact blow to the drill steel, the spirally grooved rifle bar 30 turns the pawl carrier 29 in a counterclockwise direction as viewed in FIGS. 4 and 8 causing the pawls 37 to slip over the ratchet teeth 38 so that during the forward piston stroke no rotation is imparted by the hammer piston thereby to permit an unimpeded blow to be delivered to the drill steel. During the reverse stroke of the hammer piston, i.e. during the non-working stroke, the pawls 37 engage the ratchet teeth 38 to hold the rifle bar 30 against rotation thereby causing the piston to rotate and such piston rotation is transmitted through the straight grooves 34 and chuck nut 36 to the rotatable chuck sleeve 19 and thence to the driver 21 to effect partial rotation of the drill steel. Thus during operation of the drill hammer motor the drill steel is intermittently rotated in a well known manner.

Cooperating with the ratchet and pawl mechanism is rotation release means which may be like that disclosed in the J. C. Curtis Patent 2,251,269, dated Aug. 5, 1941, comprising an annular releasing ring 40 slidingly mounted in an annular chamber 41 formed by the ratchet ring 12 and the adjacent valve box element 13, as shown in FIGS. 2 and 3. Fluid passages, later referred to, formed partially in the walls of the motor cylinder may supply pressure fluid to the opposite ends of the chamber 41 at the opposite sides of an external flange 43 on the sliding sleeve 40, for moving the latter in opposite directions. This sleeve when moved rearwardly has a bevelled inner rear surface 44 which engages the adjacent ends of the pawls 37 of the pawl carrier to depress the pawls inwardly thereby to release the pawls from engagement with the ratchet teeth 38. Thus when the pawls are released from the ratchet teeth the rifle bar 30 and integral pawl carrier 29 may freely oscillate as the motor piston reciprocates without drill steel rotation imparted thereby. When the longitudinal passage 88 is suitably vented, reducing the pressure at the front side of the ring-flange 43 and pressure fluid is supplied to the rear side of the flange, forward movement of the release-ring is effected to permit the pawls to again engage the ratchet teeth of the pawl carrier. Since this pawl release means is well known, further detail description thereof is deemed unnecessary.

Now referring to the independent motor rotation mechanism for the drill steel it will be noted that attached to the forward portion of the motor cylinder is a housing 50 having a bore 51 for receiving the forward cylindrical portion 52 of the motor cylinder as shown in FIG. 1. This housing has a gear chamber 53 closed by a rear head member 54 having a rearward sleeve portion 55 fitting within the portion of a front bore 56 in the motor cylinder. The front wall 57 of this gear housing has an opening 58 for receiving the rear sleeve portion 59 of the front chuck housing 8, and the latter abuts the front face of the housing as shown. Formed in the housing 50 is a motor chamber 60 containing a vane type rotor 61 of a conventional reversible independent rotation motor for the drill steel. It is apparent that various other suitable types of rotation motors may be employed, if desired.

An improved control valve device 62 has a manual operating handle 63 for controlling flow of pressure fluid relative to the reversible rotation motor for controlling the direction of operation thereof. This rotation motor may be used not only in rotating the drill steel during normal drilling but also may be employed in coupling the threaded joints of the sectional drill steel and may be reversed for the purpose of dispointing drill steel sections and during this reverse operation the ratchet and pawl rotation must be thrown out of operation, as later described.

Now referring to the improved means for coordinating the independent motor rotation with the ratchet and pawl rotation, to permit separate or simultaneous operation thereof, it will be noted that operatively associated with the control valve device are various ports and passages whereby the desired mode of operation may be attained. In disjointing drill steel sections it is desirable also to interrupt the delivery of impact blows to the drill steel shank, as will also later become apparent.

Figure 7:
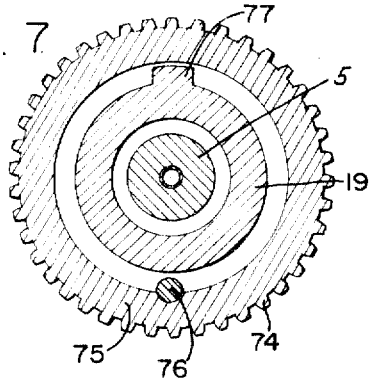
FIG. 7 is a partial cross section taken on line 7—7 of FIG. 1, showing a chuck rotating gear and its connection with the chuck sleeve.
Figure 9:
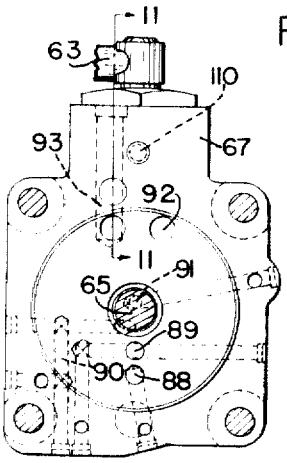
FIG. 9 is a detail cross section taken on line 9—9 of FIG. 1, looking toward the face of the valve block.

The drive between the independent rotation motor and the rotatable chuck sleeve may assume various forms but herein, for illustrative purposes, the motor rotor is secured to a longitudinal shaft 65 journaled in bearings 66 suitably supported within the gear housing and a rearward casing 67 for the control valve device. This casing may be suitably secured to the housing as shown. Formed on one end of the rotor shaft is a spur pinion 68 meshing with a spur gear 69 having its hub journaled on bearings 70 supported by a shaft 71 which is axially movably mounted in bushings 72 supported in bores in the housing. Formed to rotate with the hub of the gear 69 is a small spur gear 73 movable into meshing engagement with teeth of a spur gear 74 formed on the rotatable ring or annulus 75 mounted in the exterior of the rotatable chuck sleeve 19. The ring 75 has limited rotation relative to the chuck sleeve 19 to provide for lost motion and carries an abutment element 76 in the form of a pin engageable with a lug 77 on the chuck sleeve as shown in FIGS. 1 and 7. This "lost-motion" connection provides for limited relative rotation between the gear and chuck sleeve to enable the motor to accelerate prior to the application of a positive rotative force to the chuck sleeve. Also the abutment pin 76 upon contact with the lug 77, as the motor accelerates, delivers a hammer blow to start rotation, after which the pin 76 delivers a constant rotative force to the rotating chuck, and thence to the drill steel.

The gear 73 may be shifted axially into and out of meshing engagement with the chuck gear 74 by means of a piston 78 contained in a cylinder bore 79 with the piston desirably integral with the axially shiftable shaft 71. As later explained pressure fluid may be supplied selectively to the opposite ends of the cylinder bore to shift the piston back and forth as desired thereby to release or connect the chuck drive with the motor as desired. As shown in FIG. 1 there is slight axial clearance between the right hand bushing 72 and the adjacent face of the piston 78, so that when the gears 73 and 74 are in mesh, free rotation of the gears on the shaft 71 is permitted. Thus endwise cramping due to axial pressure on the gear-hub is avoided, as well as any motion of the gears 69, 73 when disengaged from the gear 74.

Figure 5:
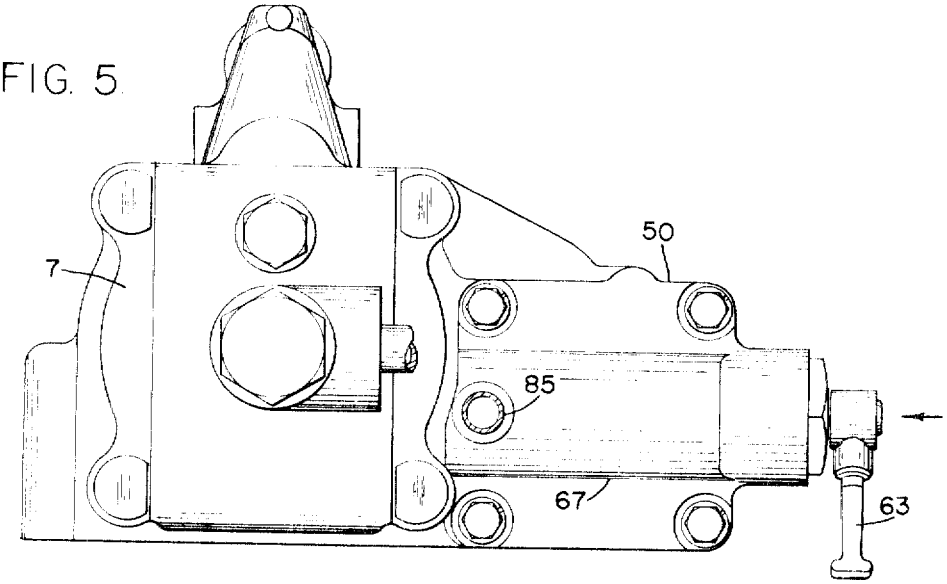
FIG. 5 is a rear end view of the rock drill shown in FIG. 1, with the view turned through 90° from the position shown in FIG. 1.
Figure 17:
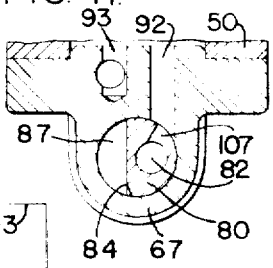
Figure 18:
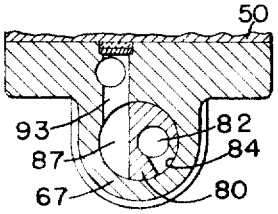

The specific structure of the valve device 62 and its associated passage means will now be described. The valve device comprises a rotary distributor 80 to which the handle 63 is secured, and having a fluid supply bore 81 and exhaust bores 82 and 83. This valve is rotatably mounted in a bore 84 of the valve casing 67. Pressure fluid may be conducted from any suitable source through a supply line 85 (FIGS. 1 and 5) and a passage 86 to the lower end of the valve receiving bore 84 and thence to valve-bore 81. The bore 81 communicates with a recess 87 in the valve formed by transveersely slotting the valve body 80 (FIGS. 17 and 18). The bore or chamber 41 at opposite sides of the pawl release ring 40 communicates with passages 88 and 89, while passages 90 and 91 communicate with the opposite ends of the bore 79 containing the gear shift piston 78. The opposite sides of the reversible rotor 61 of the independent rotation motor communicate with supply and exhaust passages 92 and 93.

The six valve sections shown in FIG. 20 are designated a, b, c, d, e and f respectively and respectively correspond to FIGS. 12, 13, 14, 15, 17 and 18.

Figure 12:
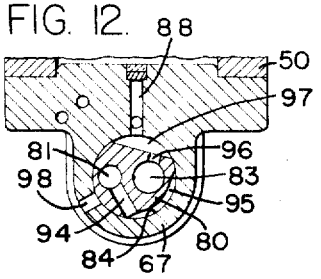
Figure 13:
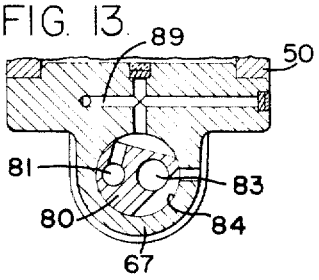

The valve has its supply bore 81 connected by a passage 94 to a circumferentially extending peripheral groove 95, as shown in FIG. 12, and the exhaust bore 83 is connected by a port 96 to a transverse peripheral groove 97 on the valve. The passage 88 in FIG. 12 is shown communicating with the exhaust 83 while the passage 89 in FIG. 13 is shown communicating with the supply 81. By reversing the valve position as shown in FIG. 12 the passage 88 may be connected to the supply 81 and the passage 89 to the exhaust 83, with the groove 97 then in communication with an exhaust port 98.

Figure 14:
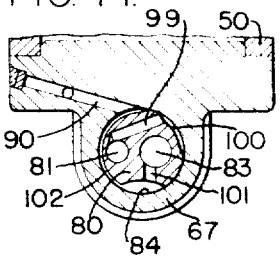
Figure 15:
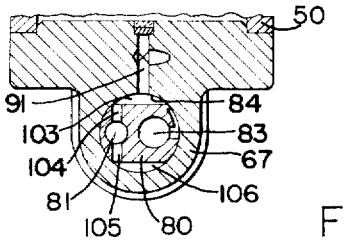
Figure 16:
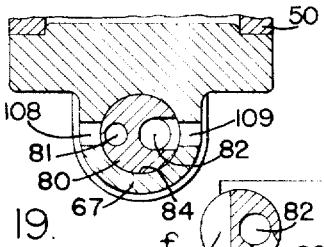
Figure 19:
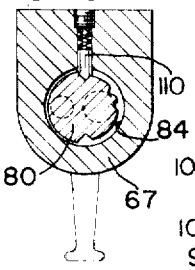

The supply bore 81 in the valve is connected, as shown in FIG. 14, by a passage 99 to a circumferentially extending peripheral groove 100 while the exhaust bore is connected by a port 101 to a circumferentially extending peripheral groove 102. Thus in FIG. 14 the passage 90 is connected to the exhaust 83 while, in FIG. 15, the passage 91 is connected by a transverse peripheral slot 103 and port 104 to the supply 81. The supply bore in FIG. 15 also is connected by a port 105 to a transverse peripheral slot 106. When the position of the valve is reversed the passage 90 is connected to the supply 81 while the passage 91 is connected to the exhaust 83. In FIG. 17 the motor passage 92 is shown connected through a port 107 to the exhaust bore 82 while in FIG. 18 the other motor passage 93 communicates with the supply groove 87. When the position of the valve is reversed the motor passage 92 may be connected to the supply groove 87 while the motor passage 93 is connected to the exhaust 82. In FIG. 16 there are shown exhaust ports 108 and 109 with which the exhaust bore 82 is communicable in the different valve positions. In FIG. 19 there is shown a conventional spring pressed detent 110 which is engageable with suitably located notches on the valve periphery for holding the valve in its different positions.

Figure 6:
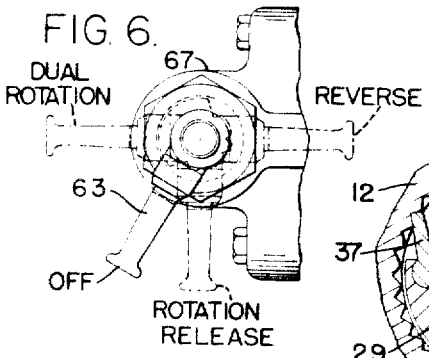
FIG. 6 is a detail view looking in the direction of the arrow at the right of FIG. 5, illustrating the several positions of the rotation control valve handle.

In FIG. 6 the valve handle 63 is shown in its "off" or so-called normal drilling position and at that time the drill steel is intermittently rotated in a normal manner through the ratchet and pawl mechanism. When the valve handle is turned to the "dual rotation" position shown in FIG. 6 the valve is located as shown in FIG. 20 with the gear shift piston 78 located at the left in its connected position and with the pawl release ring 40 located in its right hand released position. At that time the drill steel is rotated by both the ratchet and pawl mechanism and the independent rotation motor. If independent operation of the rotation motor in the same direction is desired, as for example during connection of the drill steel joints, the hammer motor is shut down, with the rifle bar and motor piston revolving with the chuck, and at that time the pawls slip over the ratchet teeth with the ratchet and pawl rotation mechanism inactive. When the valve handle is located in its "rotation release" position shown in FIG. 6 the pawl release ring 40 is shifted to its left hand pawl releasing position with the ratchet and pawl rotation interrupted and the independent motor is shut down. When the valve handle is moved to the "reverse" position shown in FIG. 6 the ratchet and pawl mechanism remains inoperative and the independent rotation motor is reversed for the purpose of disjointing the drill steel sections, as previously explained. At that time the hammer motor may remain inactive, if desired, as later explained.

The percussive motor has a usual throttle valve, not shown, for controlling the supply of pressure fluid thereto, and during running of the hammer motor during manual operation of the drill, the hammer piston delivers repeated impact blows to the shank of the drill steel percussively to actuate the drill bit, and the ratchet and pawl rotation mechanism effects intermittent rotation of the hammer piston which is transmitted through the drill chuck to the drill steel and thence to the drill bit. When an additional rotative force on the drill steel is desired, the rotary distributor 80 may be manipulated to the position shown diagrammatically in FIG. 20 to effect running of the independent rotation motor which drives through the spur reduction gearing the drill steel chuck.

The independent rotation motor may also be employed to rotate the drill steel shank to aid in coupling the joints of the sectional drill steel, and at that time the percussive motor may be stopped. For the purpose of disjointing the drill steel sections, the valve 80 may be turned to rotation release, as shown diagrammatically in FIG. 21, and the hammer piston of the perchssive motor may desirably be operated a few strokes until the jars have loosened the joint. The percussive motor is then stopped and the valve 80 turned to reverse rotation, to effect unscrewing of the threaded joints of the drill steel. Thus the drill steel joints may be connected or disconnected by the independent rotation motor without the hammer piston hitting the drill steel, thereby eliminating the possibility of thread damage to the threaded joints.

The lost motion connection in the spur gear drive between the independent rotation motor and the drill steel enables the rotation motor, when started, to accelerate, and the abutitng lugs 76, 77 provide a sudden impact action to be imparted to the drill steel, prior to the delivery of a constant rotative force to the rotating chuck, and thence to the drill steel. By coordinating the ratchet and pawl rotation with the control of the independent rotation motor, the ratchet and pawl mechanism is automatically rendered inoperative whenever the independent rotation motor is reversed. Also the ratchet and pawl rotation may be interrupted independently of operation of the independent rotation motor to enable running of the percussive motor without steel rotation.

As a result of this invention an improved hammer rock drill is provided which may operate in a normal manner with ratchet and pawl intermittent rotation of the drill steel. By the provision of the independent rotation motor and the improved control means the independent motor may be operated to supplement the normal ratchet and pawl rotation and at times the independent motor may supplant the ratchet and pawl rotation. When it is desired to connect or disjoint the drill steel sections the indepedent motor may be reversed and improved means is provided for automatically throwing out the ratchet and pawl rotation whenever the independent rotation motor is reversed, and during the disjointing of the drill steel sections the hammer motor may be shut down. By the provision of the lost motion connection in the spur gear drive between the independent rotation motor and the drill steel, the rotation motor may accelerate, prior to the delivery of a positive rotative force to the drill steel.

The abutment lugs associated with the lost motion connection enable the transmission of an impact action to the drill steel, in an improved manner. The improved independent rotation and its control may be applied to a conventional hammer rock drill with a minimum of change. These and other advantages of the inveniton will be clearly apparent to those skilled in the art.

While there is in this application specifically described one form which the invention may assume in practice, it will be understood that this form is shown for purposes of illustration and that the invention may be modified and embodied in various other forms without departing from its spirit or the scope of the appended claims.

What we claim as new and desire to secure by Letters Patent is:

1. In a hammer rock drill a motor for percussively actuating a drill steel including a hammer piston and ratchet and pawl rotation mechanism operatively connected to said hammer piston whereby said rotation mechanism is operable to intermittently rotate the drill steel as it is percussively actuated, means for rendering said ratchet and pawl rotation mechanism inactive, an independent rotation motor for rotating the drill steel for supplementing or supplanting said ratchet and pawl rotation mechanism, said independent rotation motor being reversible, and means for operating said means for rendering said ratchet and pawl rotation mechanism inactive whenever said independent rotation motor is reversed.

2. In a hammer rock drill a pressure fluid motor having a reciprocating hammer piston for percussively actuating a drill steel, a ratchet and pawl rotation mechanism operatively connected to said piston whereby the latter may intermittently rotate the drill steel as it reciprocates, pressure fluid operated means for rendering said ratchet and pawl rotation mechanism inactive during operation of said percussive motor, an independent pressure fluid actuated motor for rotating the drill still, and control valve means for controlling said means for rendering said ratchet and pawl mechanism inactive and said independent rotation motor.

3. A hammer rock drill as set forth in claim 2 wherein said independent rotation motor is reversible and said means for rendering said ratchet and pawl rotation mechanism inactive is automatically operated whenever said independent rotation motor is reversed.

4. In a hammer rock drill, a motor for percussively actuating a drill steel, a separate motor for rotating the drill steel, and means for operatively connecting said rotation motor to the drill steel including a gear, a rotating chuck member and *means on said gear and means on said chuck member engageable to form* a lost-motion connection between said gear and said chuck member whereby said rotation motor may accelerate before rotation drive is effected.

5. A hammer rock drill as set forth in claim 4 wherein said gear and said chuck member have relatively movable lugs which suddenly engage as said rotation motor accelerates to impart an impact blow to said chuck member.

6. In a hammer rock drill, a hammer motor for percussively actuating a drill steel and having a reciprocatory hammer piston, a ratchet and pawl mechanism operatively connected to said piston for actuation thereby whereby said piston effects intermittent drill steel rotation, an independent rotation mechanism for the drill steel, and means for coordinating said independent rotation means with said ratchet and pawl mechanism whereby said independent rotation means may supplement or supplant said ratchet and pawl mechanism.

7. A hammer rock drill as set forth in claim 6 wherein said independent rotation mechanism is reversible and said coordinating means automatically effects interruption of the operation of said ratchet and pawl mechanism whenever said independent rotation means is reversed.

8. In a hammer rock drill, a pressure fluid operated hammer motor having a hammer piston for percussively actuating a drill steel, a ratchet and pawl mechanism operatively connected to said piston for actuation thereby whereby said piston effects drill steel rotation as it is percussively actuated, a fluid actuated device for interrupting the operation of said ratchet and pawl mechanism, a fluid actuated rotation motor, fluid actuated means for effecting connection of said rotation motor with the drill steel, and control valve means for said fluid actuated device and said fluid actuated means.

9. A hammer rock drill as set forth in claim 8 wherein said rotation motor is reversible, and means is provided for automatically effecting operation of said fluid actuated device to render said ratchet and pawl mechanism inactive whenever said rotation motor is reversed.

10. In a hammer rock drill, a percussive motor having a reciprocatory hammer piston for percussively actuating a drill steel, an independent rotation motor, and driving connections between said rotation motor and the drill steel embodying means *rotatable by said driving motor and means on said chuck member* [for providing] *engageable to provide* a lost-motion connection whereby said rotation motor may accelerate *through a plurality of rotations* prior to *impact drive followed by* positive drive of the drill steel.

11. In a hammer rock drill, means having a reciprocable piston for percussively actuating a drill steel, a ratchet and pawl rotation mechanism operatively connected to said means whereby said piston is operable to intermittently rotate such drill steel during reciprocation of said piston in one direction, and an independent rotation motor for rotating such drill steel for supplementing said ratchet and pawl rotation mechanism, and means for coordinating said independent rotation motor with said ratchet and pawl rotation mechanism whereby said rotation motor may be operaed to effect drill steel rotation either independently of or simultaneously with said ratchet and pawl.

12. In a hammer rock drill, a motor for percussively actuating a drill steel, a ratchet and pawl rotation mechanism operatively connected to said motor whereby the motor piston may intermittently rotate the drill steel as it is percussively actuated, and an independent rotation motor for rotating the drill steel for supplementing the ratchet and pawl rotation mechanism, said independent motor rotation mechanism is reversible, and means is provided for automatically rendering said ratchet and pawl mechanism inoperative whenever said independent motor rotation is reversed.

13. In a hammer rock drill, a motor for percussively actuating a drill steel, a ratchet and pawl rotation mechanism operatively connected to said motor whereby the motor piston may intermittently rotate the drill steel as it is percussively actuated, and an independent rotation motor for rotating the drill steel for supplementing the ratchet and pawl rotation mechanism, said independent motor rotation mechanism being reversible, and means is provided for automatically rendering said ratchet and pawl mechanism inoperative whenever said independent motor rotation is reversed, said percussive motor, said independent rotation motors and said means for rendering said ratchet and pawl mechanism inoperative are pressure fluid actuated and said means for automatically rendering said ratchet and pawl mechanism inactive comprises control valve means for controlling the pressure fluid supply to said means for rendering said ratchet and pawl mechanism inactive.

14. A hammer rock drill motor for percussively actuating a drill steel, a body having a bore, an element within said bore connectible with such drill steel, means operatively connected to said body for intermittently rotating and reciprocating said element, other means mounted on said body for rotating said element in either of opposite directions, and control means operatively associating said first mentioned means and said second mentioned means for actuating said first mentioned means and said second mentioned means simultaneously.

15. A hammer rock drill motor for percussively actuating a drill steel, a body having a bore, an element within said bore being connectible with such a drill steel for communicating drilling movements to such a drill steel, means on said body for intermittently rotating and reciprocating said element, means mounted on said body for rotating said element in either of opposite directions, and control means operatively associating said first mentioned means and said second mentioned means with a source of pressure fluid for causing concurrent actuation of said first mentioned means and said second mentioned means, said control means includes a member positionable in a plurality of control positions one of which renders said second mentioned means ineffective so that said element is rotated solely by said first mentioned means.

16. A hammer rock drill motor for percussively actuating a drill steel, a body having a bore, an element within said bore connectible with such drill steel to communicate drilling movement to such drill steel, means on said body for intermittently rotating and reciprocating said element, means associated with said element for rotating said element in either of opposite directions, and control means having a member positionable in a plurality of control positions one of which operatively associates said first mentioned means and said second mentioned means for rotation in the same direction for actuating said element in the same direction, said control means having another position which renders said second mentioned means inoperative so that said element is rotated solely by said first mentioned means, and said control means having still another position for rendering said first mentioned means inoperative so that said element is rotated solely by said second mentioned means.

17. An apparatus for controlling a motor, a body having a bore, an element reciprocably and rotatably disposed within said body, means for intermittently rotating and rectilinearly reciprocating said element in said body, means mounted on said body for rotating said element in either of opposite directions, a control device operatively associated with said first mentioned means and said second mentioned means for causing simultaneous rotation of said element by said first mentioned means and said second mentioned means.

18. An apparatus adapted for actuating a drilling element comprising, a body having a bore, reciprocable means mounted for reciprocation in said bore, means engageable with such a drilling element and which lies in the path of reciprocation of and being intermittently axially moved by said reciprocable means for causing reciprocable motion thereof, means mounted on said body responsive to the reciprocation of said reciprocable means for rotating said reciprocable means and said second mentioned means, and selectively operable means cooperably connected to said second mentioned means for assisting rotation of such a drilling element.

19. A drilling apparatus comprising, a housing having a bore, hammer means movable forwardly and rearwardly in said bore, means for moving said hammer, anvil means slidably disposed within said bore and engageable with said hammer means during forward movement of said hammer means, first means operable in response to the rearward movement of said hammer means for rotating said anvil means in a given direction about a common axis, second means being independently selectively operable for causing rotation of said anvil means about the same mentioned axis, and control means having a plurality of control positions one of which renders said first anvil rotating means ineffective and simultaneously causes rotation of said anvil means in said given direction solely by said second independent means.

20. A drilling apparatus comprising, a housing having a bore, hammer means movable forwardly and rearwardly in said bore, means for moving said hammer, anvil means slidably disposed within said bore and engageable with said hammer means during at least a portion of the forward movement of said hammer means, first means operable in response to the rearward movement of said hammer means for rotating said anvil means in a given axial direction, second means being independently selectively operable for rotating said anvil means, and control means having a plurality of control positions one of which renders said second independent anvil rotating means ineffective and simultaneously causes rotation of said anvil means in said given direction solely by said first means.

21. An apparatus adapted for actuating a drilling element comprising, a body having a bore, reciprocable means mounted for reciprocation in said bore, means engageable with such a drilling element and which lies in the path of reciprocation of and being intermittently axially moved by said reciprocable means for causing reciprocable motion thereof, means carried by said body having a portion cooperable only with said reciprocable means for rotating said second mentioned selectively operable means, and means cooperably connected to said second mentioned means for causing rotation of said second mentioned means independently of said third mentioned means.

22. An apparatus adapted for actuating a drilling element comprising, a body having a bore, reciprocable means mounted for reciprocation in said bore, means engageable with such a drilling element and which lies in the path of reciprocation of and being intermittently axially moved by said reciprocable means for causing reciprocable motion thereof, means carried by said body having a portion operatively connected only with said reciprocable means for rotating said engageable means, selectively operable means cooperably connected to said engageable means for causing rotation of said engageable means independently of said means carried by said body, and said selectively operable means being additionally operable for rotating said engageable means in either of opposite directions.

23. A drilling apparatus comprising, a body having a bore, reciprocable means mounted for reciprocation in said bore, means located within said bore and lying in the path of reciprocation of and intermittently actuated by said reciprocable means, means for rotating said reciprocable means and said second mentioned means, and selectively operable means cooperably connected to said second mentioned means for causing rotation thereof independently of said third mentioned means.

24. An apparatus adapted for actuating a drilling element comprising, a body having a bore, reciprocable means mounted for reciprocation in said bore, means engageable with such a drilling element and which lies in the path of reciprocation of and being intermittently axially moved by said reciprocable means for causing reciprocable motion thereof, means mounted on said body responsive to the reciprocation of said reciprocable means for rotating said reciprocable means and said second mentioned means, and selectively operable means cooperably connected to said second mentioned means for assisting in the rotation of such a drilling element.

25. An apparatus adapted for actuating a drilling element comprising, a body having a bore, reciprocable means mounted for reciprocation in said bore, means connectable to such a drilling element and which lies in the path of reciprocation of and being intermittently axially moved by said reciprocable means for causing reciprocable motion thereof, means carried by said body which is cooperable with said reciprocable means for rotating said reciprocable means, means cooperable with said reciprocating means and said second mentioned means for rotating said second mentioned means when said reciprocating means is rotated by said third mentioned means, and selectively operable means cooperably connected to said second mentioned means for assisting in the rotation of such a drilling element.

26. A drilling apparatus comprising, a body having a bore, a first member rectilinearly reciprocable in said bore, means for effecting reciprocable movement of said first member, means mounted on said body and operatively actuated by said first member for rotating said first member in a given direction during rectilinear movement thereof in one direction, a second member actuated for rectilinear movement in said bore by engagement with said first member when said first member is rectilinearly moved in another direction, said first and second members having cooperable slidable coupling means for imparting rotation to said second member when said first member is rotated in said given direction while permitting relative slidable movement between said members, a reversible rotatable means operatively connected to said second member for causing rotation thereof independently of said first member, and control means which is selectively operable to render said means for rotating said first member ineffective.

27. A drilling apparatus comprising, a body having a bore, a first member reciprocably movable in said bore, means for effecting reciprocation of said first member, means mounted on said body and operatively actuated by reciprocation of said first member for rotating said first member in a given direction during reciprocation thereof, a second member mounted in said bore for reciprocable movement therein by engagement with said first member when said first member is rectilinearly moved in one direction, said first and said second members having cooperable slidable coupling means for imparting rotation to said second member while permitting relative slidable movement between said members, and selectively operable means having control means cooperable therewith being positionable in a plurality of operable positions for rendering said means for rotating said first member inactive so that said second member is rotated solely by said selectively operable means.

28. A drilling apparatus comprising, a housing having a bore, a first member rectilinearly reciprocable in said bore, means for effecting reciprocable movement of said first member, means mounted on said housing being operatively actuated by said first member for rotating said first member in a given direction during rectilinear movement thereof in one direction, a second member disposed within said bore in the path of reciprocation of said first member for receiving impact when said first member rectilinearly moves in another direction, said first and second members having cooperable slidable coupling means imparting rotation to said second member when said first member is rotated in said given direction while permitting relative slidable movement between said members, and selectively operable means having a control device positionable in a plurality of positions and connected to said second member for assisting rotation of said second member in such given direction when in one position, for rendering said second mentioned means inactive to permit rotation of said second member solely by said selectively operable means when in another position, for rendering said selectively operable means inactive to permit rotation of said first member solely by said second mentioned means, and for rendering said second mentioned means inactive and rotate said second member in a direction opposite to said given direction.

29. A drilling apparatus comprising, a housing having a bore, pressure fluid responsive means mounted for reciprocation in said bore; movable means supported by said housing and lying in the path of reciprocation of and intermittently abuttingly engaged by said pressure fluid responsive means for reciprocation thereby; means responsive to the reciprocation of said pressure fluid responsive means for intermittingly rotating said pressure fluid responsive means and said movable means in one direction; means having an output cooperably connected to said movable means for rotating said movable means and said pressure fluid responsive means in said one direction or in a direction opposite said one direction; and control means operatively connected to said means for intermittingly rotating and said means having an output for selectively rendering either said means for intermittingly rotating said means having an output, effective simultaneously or independently when caused to rotate in said one direction; and said control means being operable to render said intermittingly operable means ineffective when said means having an output is caused to rotate in a direction opposite to said one direction.

30. A drilling apparatus comprising, a housing having a bore, hammer means movable forwardly and rearwardly in said bore, means for moving said hammer forwardly and rearwardly, anvil means slidably disposed within said bore and strikingly engageable with said hammer means during forward movement of said hammer means, means operable in response to the rearward movement of said hammer means for rotating said anvil means and said hammer means in a given direction, selectively operable independent rotatable means for causing rotation of said anvil means in either of opposite directions, and control means having a plurality of control positions one of which renders said first mentioned anvil rotating means ineffective and simultaneously causes rotation of said anvil by said independent rotatable means in a direction opposite to such given direction.

31. A drilling apparatus comprising, a housing having a bore, hammer means movable forwardly and rearwardly in said bore, means for moving said hammer, anvil means slidably disposed within said bore and instantaneously engageable and disengageable with said hammer means during forward and rearward movement respectively of said hammer means, means operable in response to the rearward movement of said hammer means for rotating said anvil means and said hammer means in a given direction, selectively operable independent rotatable means for causing rotation of said anvil means in either of opposite directions, control means having a plurality of control positions one of which renders said first mentioned anvil rotating means ineffective and simultaneously causes rotation of said anvil means solely by said independent rotatable means, said independent rotatable means having means cooperable with said anvil means operatively disconnecting said independent rotatable means from said anvil means when said control means is positioned to render said hammer and anvil rotating means ineffective.

32. A drilling apparatus comprising, a housing having a bore, a first member rectilinearly reciprocable in said bore, means for effecting reciprocable movement of said first member, means mounted on said housing being operatively actuated by said first member for rotating said first member in a given direction during rectilinear movement thereof in one direction, a second member disposed within said bore in the path of reciprocation of said first member for receiving impact when said first member rectilinearly moves in another direction, said first and second members having cooperable slidable coupling means for imparting rotation to said second member when said first member is rotated in said given direction while permitting relative slidable movement between said members, and selectively operable means having a control device positionable in a plurality of positions and connected to said second member for assisting rotation of said second member in such given direction when in one position and for rendering said second mentioned means inactive and permit rotation of said second member in a direction opposite to such given direction solely by said selectively operable means.

33. An apparatus adapted for actuating a drilling element comprising, a body having a bore, rectilinearly reciprocable means mounted for reciprocation in said bore in response to pressure fluid admitted thereto, means adapted to be connected to such a drilling element and which lies in the path of reciprocation of and being intermittently axially actuated by said reciprocable means for transferring reciprocable motion to such a drilling element, means mounted on said body responsive to the rectilinear reciprocation of said reciprocable means when moving in a given direction for rotating said rectilinearly reciprocable means and such a drilling element in one direction, means responsive to pressure fluid having an output thereof cooperably connected to said motion transferring means for also rotating such a drilling element, and control means having a plurality of control positions with the input thereof connected to a source of pressure fluid and the output connected to said last mentioned means wherein one of said positions renders said first mentioned rotating means ineffective and causes rotation of such drilling element in a direction opposite to such one direction solely by said last mentioned pressure fluid responsive means.

34. A percussively actuated rock drilling motor, a body having a bore, a ratchet and pawl mechanism, means responsive to pressure fluid for selectively rendering said ratchet and pawl mechanism ineffective, a hammer piston slidably disposed within said bore with a portion thereof operatively connected to said ratchet and pawl mechanism, means for moving said piston in opposite directions in said bore, an anvil slidably disposed within said bore and engageable with said hammer piston when said hammer piston is moved in one of said opposite directions, spline means connecting said hammer piston and said anvil for imparting rotation to said anvil when said hammer piston is moved in another of said opposite directions and permitting relative slidable movement therebetween, an independent motor being operable in either of opposite directions mounted on said body, said motor having an output, gear means connected to said spline means, other gear means selectively movable for engagement with said first mentioned gear means for transmitting rotation to said spline means, control valve means having a plurality of operable positions for controlling the flow of pressure fluid; to said means for rendering said ratchet and pawl mechanism ineffective, to said other gear means, and to said independent motor, said control valve being operably positionable to actuate said first mentioned means for rendering said ratchet and pawls ineffective and simultaneously moving said other gear for engagement with said gear means for causing rotation of said anvil whereby the anvil is rotatable in either of such opposite directions solely by said independent motor.

35. The combination of claim 34 said control valve is further operably positionable to move said other gear means out of engagement with said gear means and simultaneously rendering said ratchet and pawl mechanism effective so that said anvil is rotated solely by said ratchet and pawl mechanism.

36. The combination of claim 34 wherein said control valve is further positionable to move said other gear means in engagement with said gear means and simultaneously rendering said ratchet and pawl mechanism effective so that said anvil is rotated by said independent motor and said ratchet and pawl mechanism.

37. The combination of claim 34 wherein positioning said control valve to rotate said independent motor in a direction opposite to the direction of rotation of said ratchet and pawl mechanism renders said ratchet and pawl mechanism ineffective.

38. A hammer rock drill motor for percussively actuating a drill steel, a body having a bore, an element within said bore connectible with such drill steel, means operatively connected to said body for intermittingly rotating and reciprocating said element, an independent motor having a selectively operable geared output being rotatable in either of opposite directions, cooperable gear means associating said element and said geared output, control means having a plurality of control positions operably connecting said intermittingly rotating means, said independent motor, and said cooperable gear means, said control means being operable to render said intermittingly rotating means ineffective while causing rotation of said element in either of opposite directions solely by said independent motor, said control means being further operable to cause rotation of said element by rendering said intermittingly rotating means and said independent motor simultaneously effective to cooperate to cause rotation of said element in only one of said directions.

*39. A device for actuating a rock drilling tool comprising a pressure fluid-actuated percussive motor operable to impact said tool; a pressure fluid-actuated rotary driving motor independent of the first mentioned motor and operable to rotate said tool bidirectionally; control means for said percussive motor and said rotary motor comprising independent pressure fluid valves selectively operable for effecting tool impacting without tool rotation, bidirectional tool rotation without tool impacting, and tool impacting with bidirectional tool rotation; and, said valve for said rotary driving means having opposed operating positions for effecting reversible tool rotation and a neutral position.*

*40. A device for actuating a rock drilling tool comprising a pressure fluid-actuated percussive motor operable to impact said tool; a pressure fluid-actuated rotary driving motor independent of the first mentioned motor and operable to rotate said tool bidirectionally; independent control means for said percussive motor and said rotary motor respectively comprising selectively operable valve means for controlling independent pressure fluid streams to effect tool impacting without tool rotation, bidirectional tool rotation without tool impacting, and tool impacting with bidirectional tool rotation; and, said valve means for said rotary driving means having opposed operating positions for effecting reversible tool rotation and a neutral position.*

References Cited

The following references, cited by the Examiner, are of record in the patented file of this patent or the original patent.

UNITED STATES PATENTS

| | | | |
|---|---|---|---|
| 660,961 | 10/1900 | Jones et al. | |
| 1,061,788 | 5/1913 | Smith. | |
| 1,318,617 | 10/1919 | Smith | 173—105 |
| 1,408,684 | 3/1922 | Bayles et al. | |
| 1,455,553 | 3/1923 | Hansen. | |
| 1,456,234 | 5/1923 | Slater. | |
| 1,597,192 | 8/1926 | Hansen. | |
| 1,713,987 | 5/1929 | Stevens. | |
| 1,760,316 | 5/1930 | Osgood. | |
| 1,760,582 | 5/1930 | Clark | 173—105 |
| 1,761,310 | 6/1930 | Osgood. | |
| 2,023,841 | 12/1935 | Kingsbury. | |
| 2,051,053 | 8/1936 | Morris. | |
| 2,167,673 | 8/1939 | Oberhoffken. | |
| 2,224,860 | 12/1940 | Curtis. | |
| 2,224,861 | 12/1940 | Curtis. | |
| 2,242,739 | 5/1941 | Anderson. | |
| 2,307,865 | 1/1943 | Slater. | |
| 2,536,971 | 1/1951 | Weyandt et al. | 173—105 |
| 2,547,079 | 4/1951 | Gerentes. | |
| 2,688,268 | 9/1954 | Lear. | |
| 2,778,605 | 1/1957 | Humn | 173—105 |

FRED C. MATTERN, Jr., *Primary Examiner.*

BROUGTHON G. DURHAM, *Examiner.*

L. P. KESSLER, *Assistant Examiner.*